Nov. 9, 1948.  L. R. BUCKENDALE  2,453,116
VEHICLE SUSPENSION
Filed Oct. 28, 1943  13 Sheets-Sheet 1
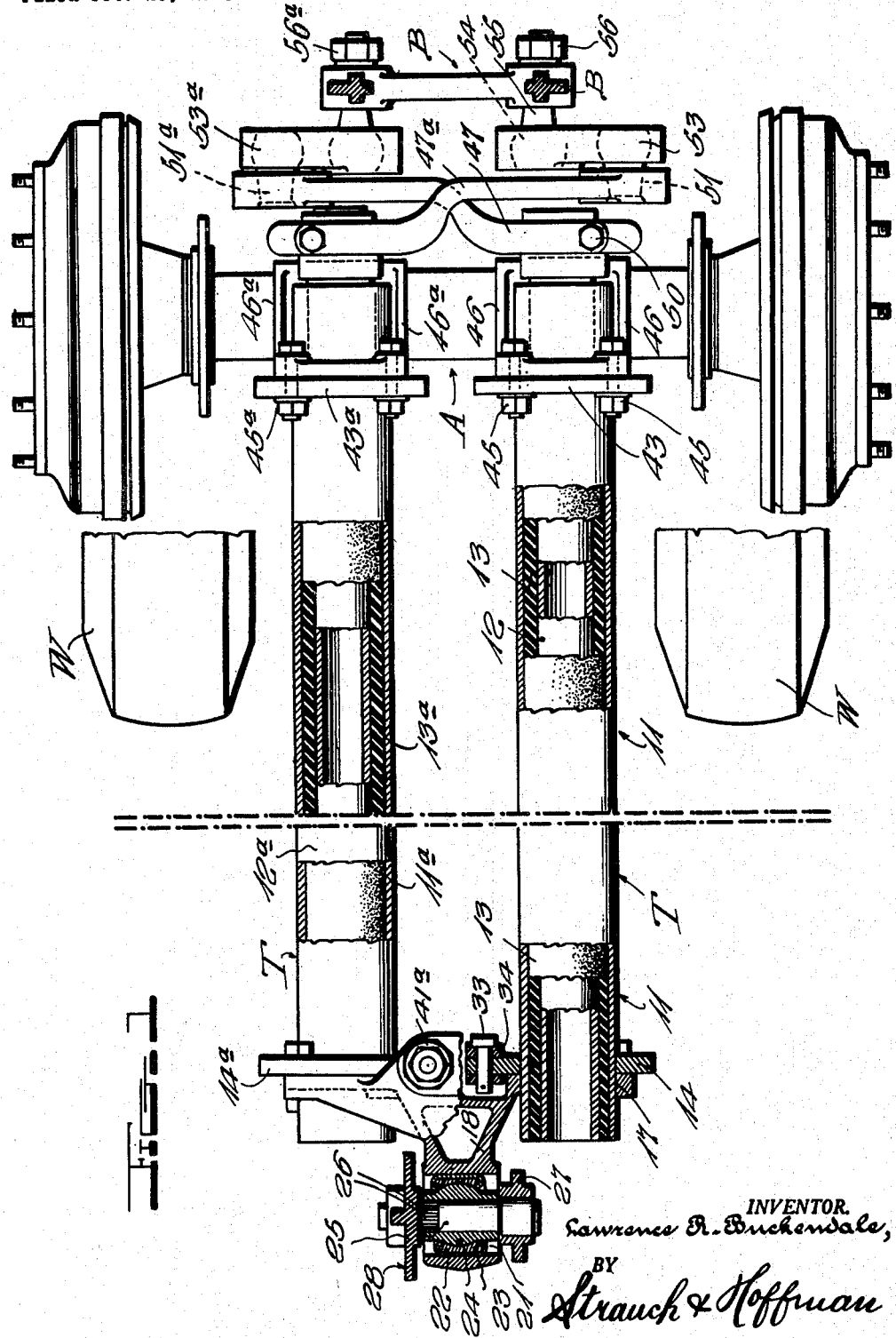
INVENTOR.
Lawrence R. Buckendale,
BY
Strauch & Hoffman
ATTORNEYS

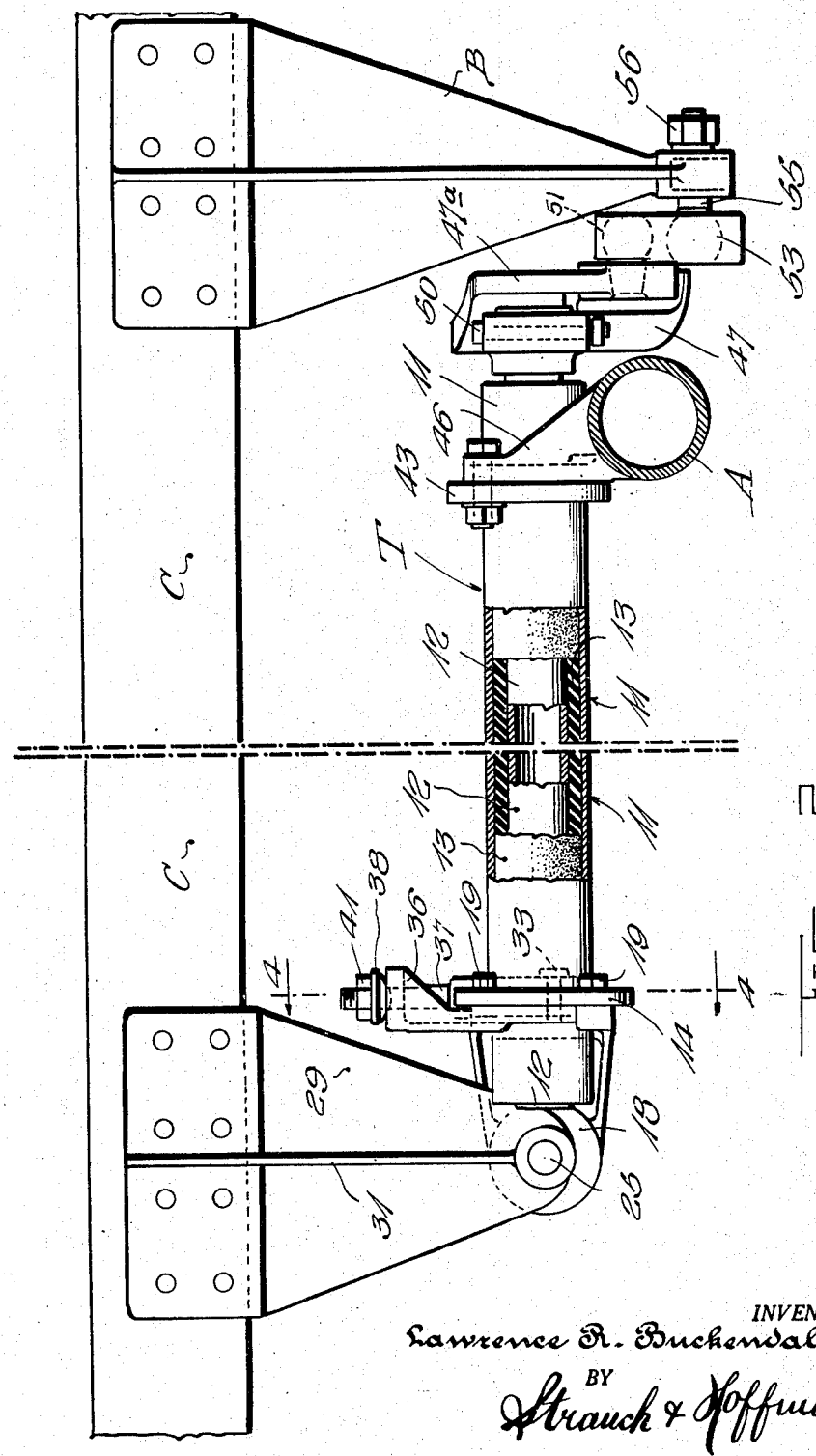

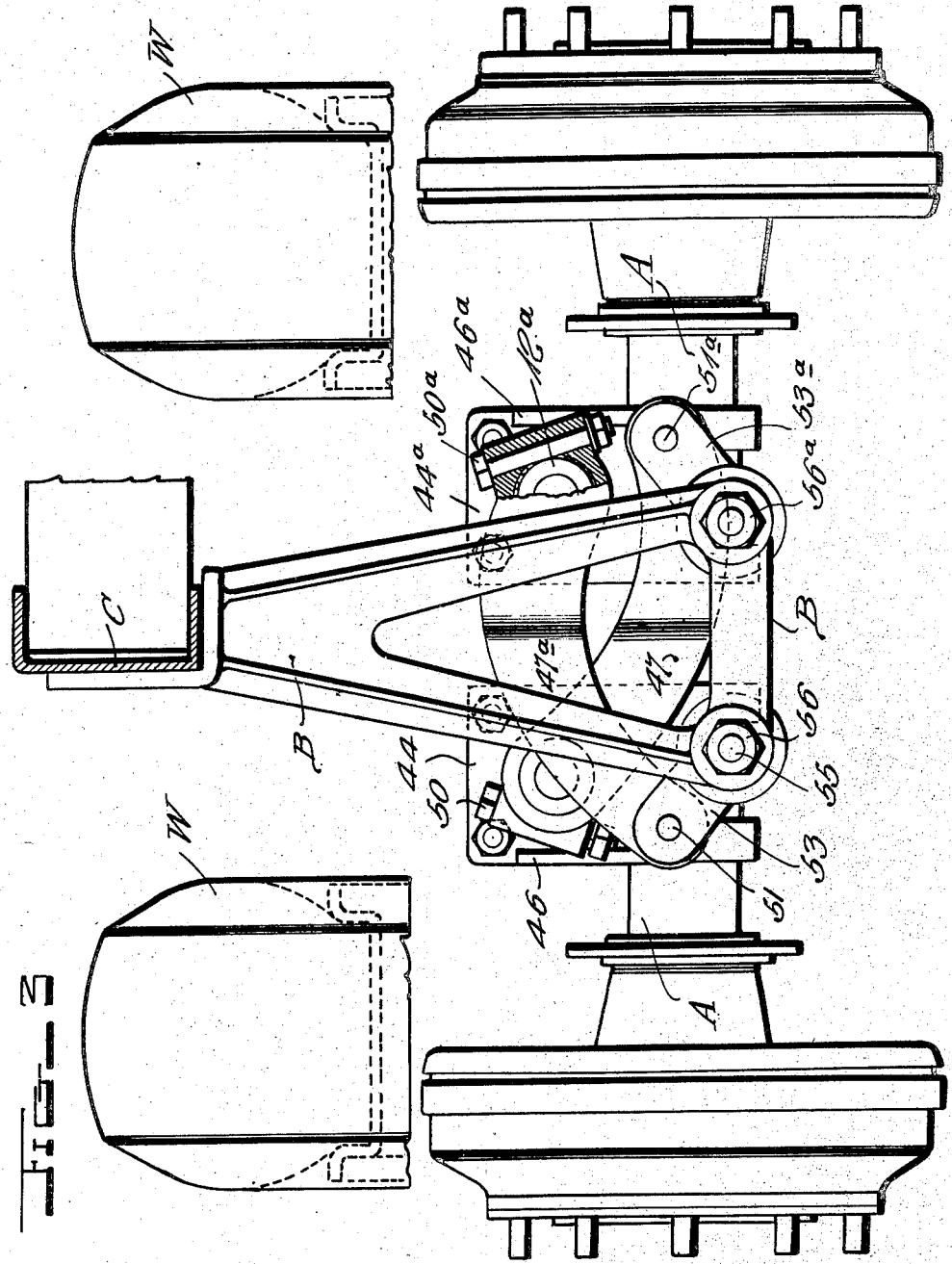

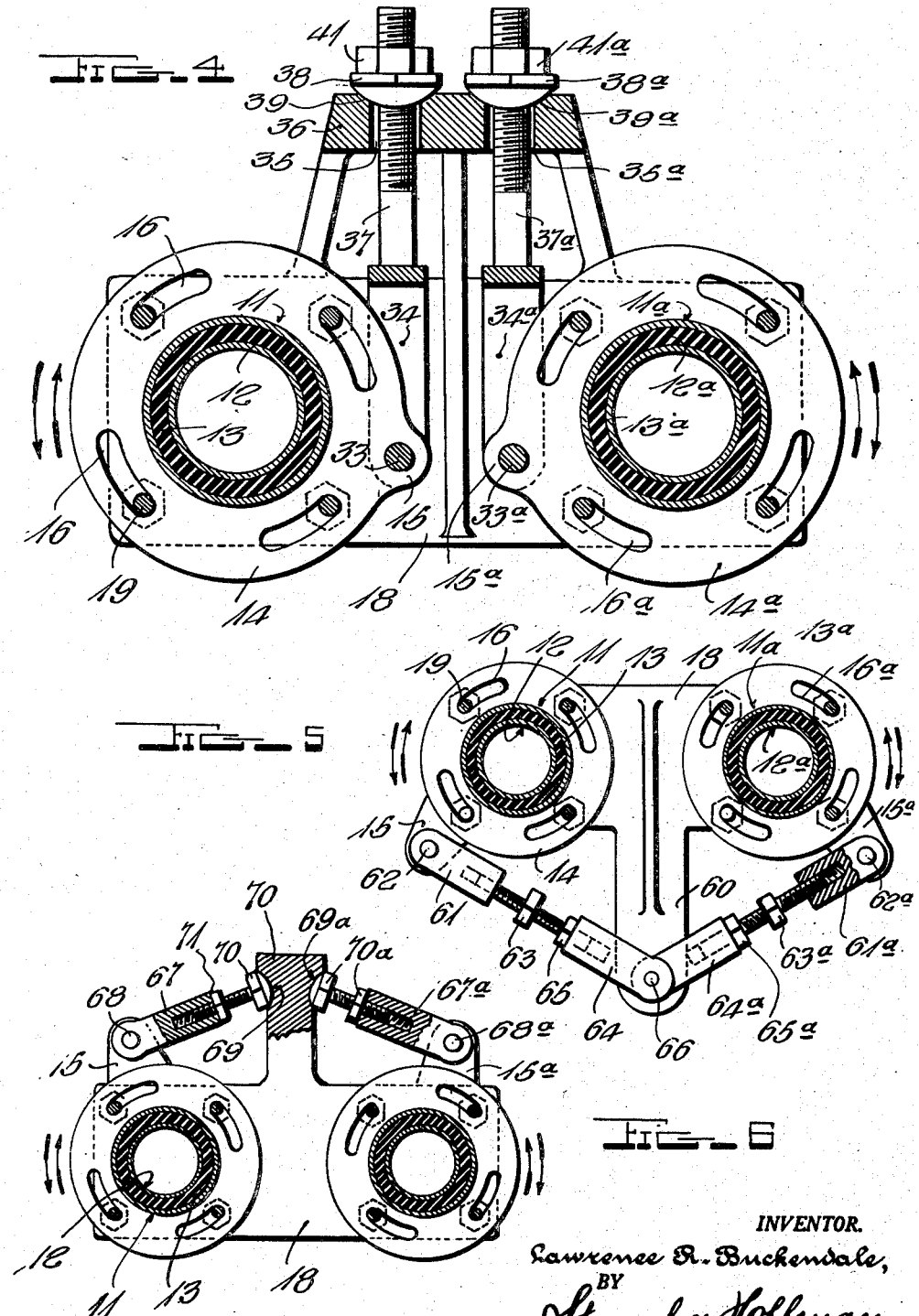

Nov. 9, 1948.  L. R. BUCKENDALE  2,453,116
VEHICLE SUSPENSION
Filed Oct. 28, 1943  13 Sheets-Sheet 5
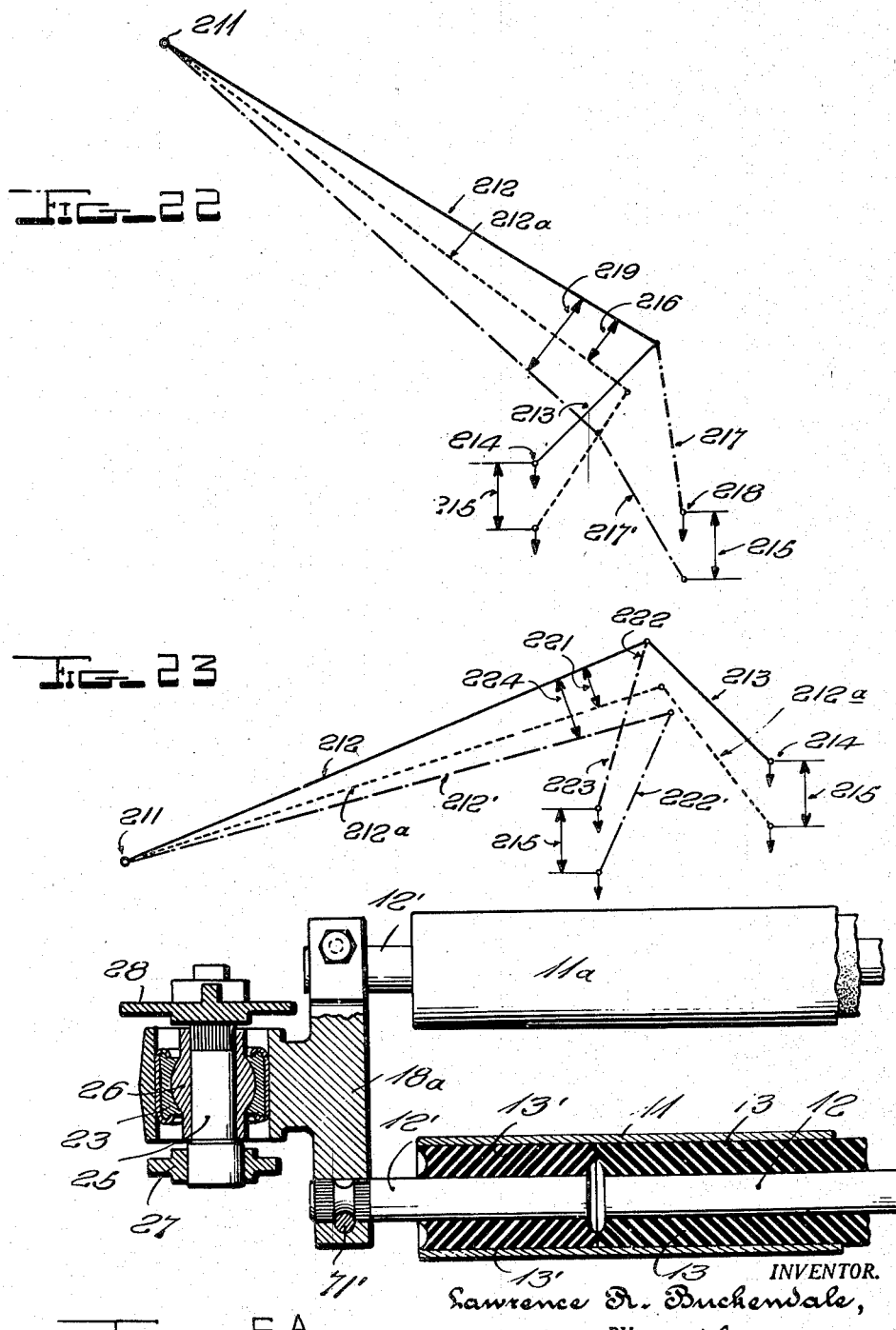
INVENTOR.
Lawrence R. Buckendale,
BY
Strauch & Hoffman
ATTORNEYS.

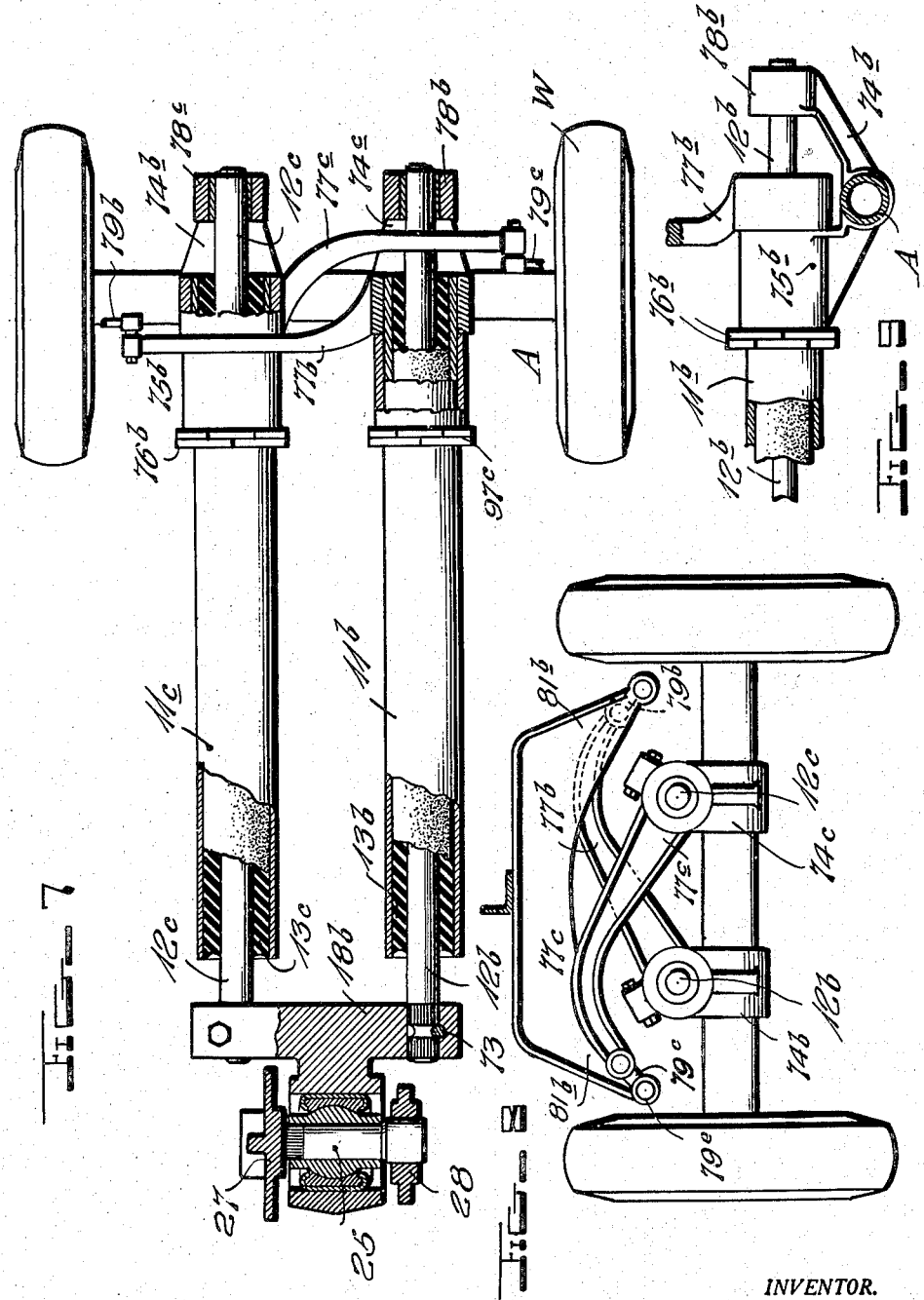

Nov. 9, 1948.  L. R. BUCKENDALE  2,453,116
VEHICLE SUSPENSION
Filed Oct. 28, 1943  13 Sheets-Sheet 7
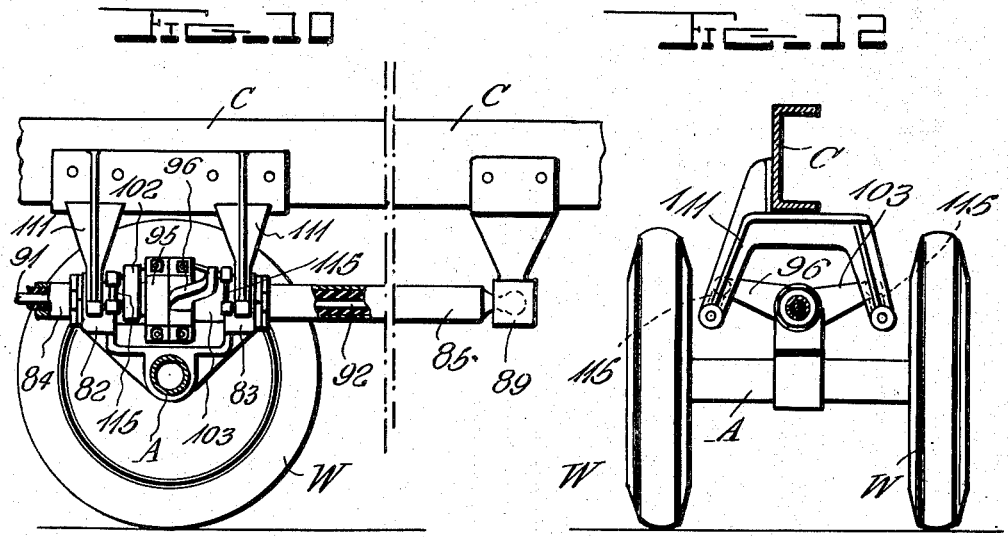
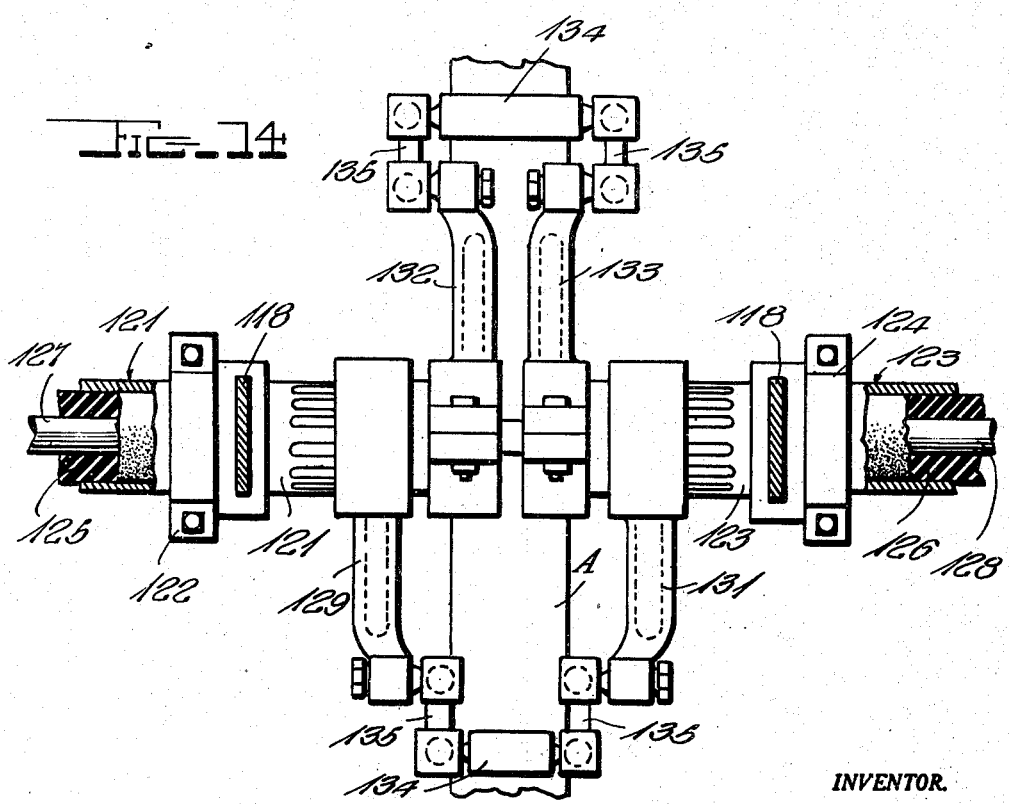
INVENTOR.
Lawrence R. Buckendale,
BY
Strauch & Hoffman
ATTORNEYS

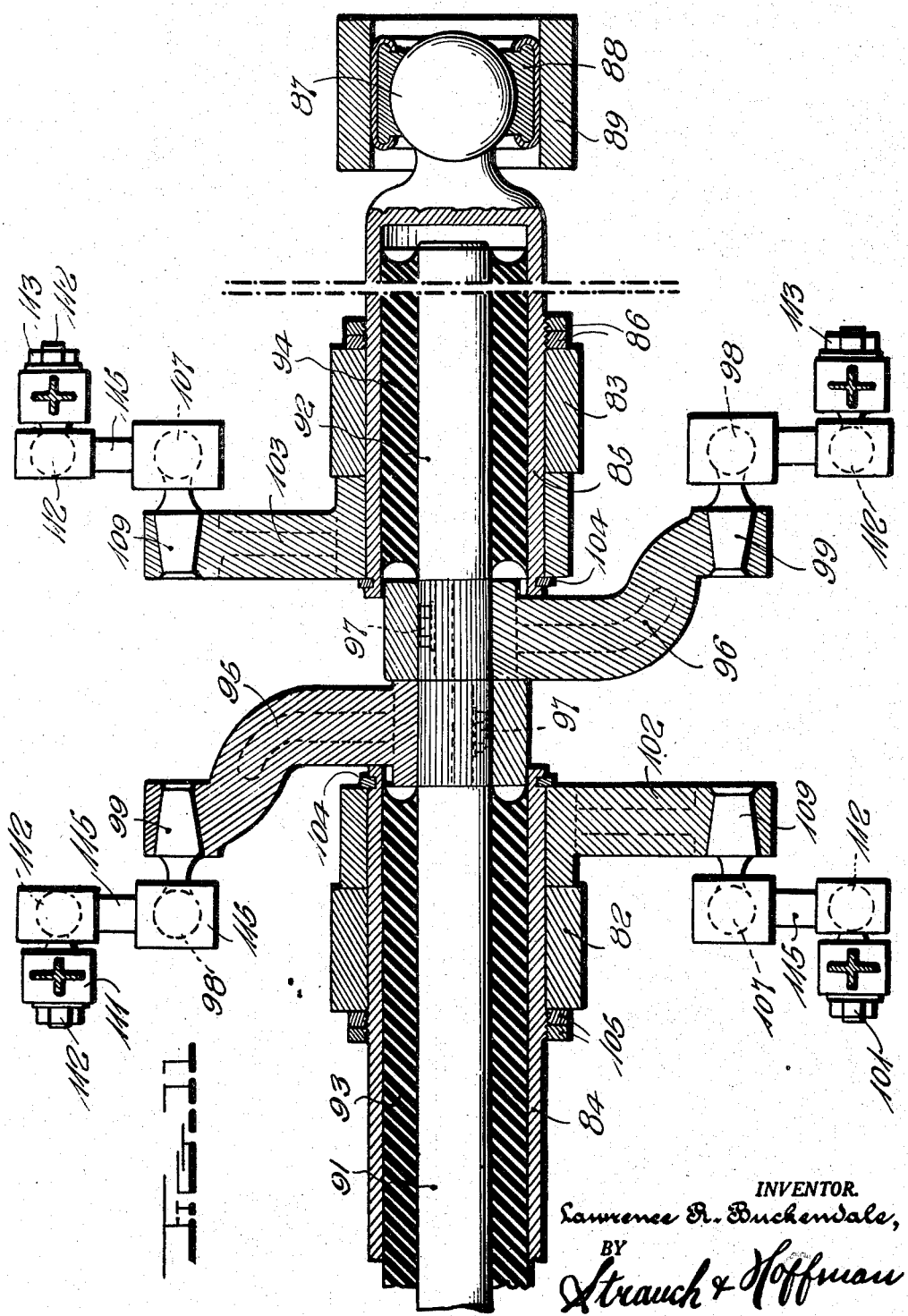

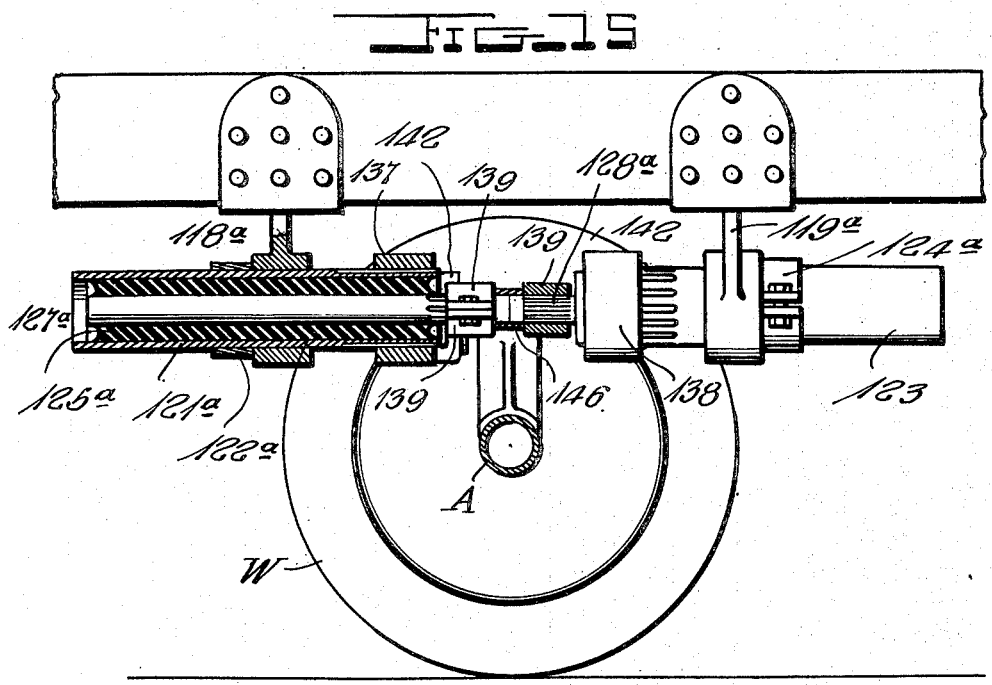
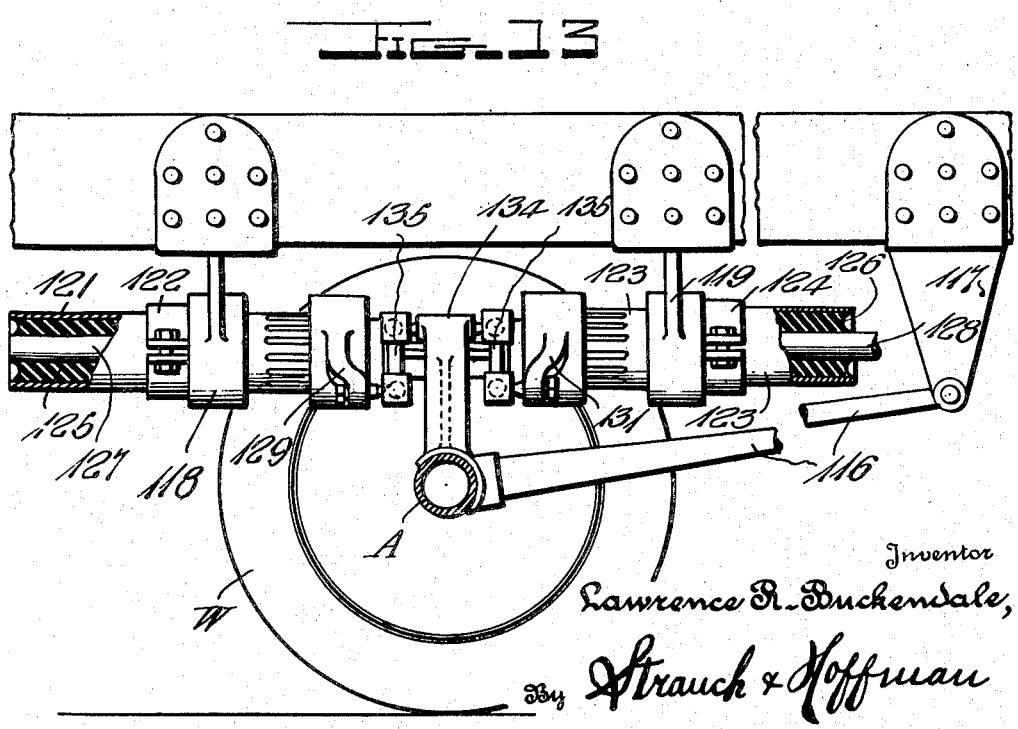

Nov. 9, 1948.  L. R. BUCKENDALE  2,453,116
VEHICLE SUSPENSION
Filed Oct. 28, 1943  13 Sheets-Sheet 10
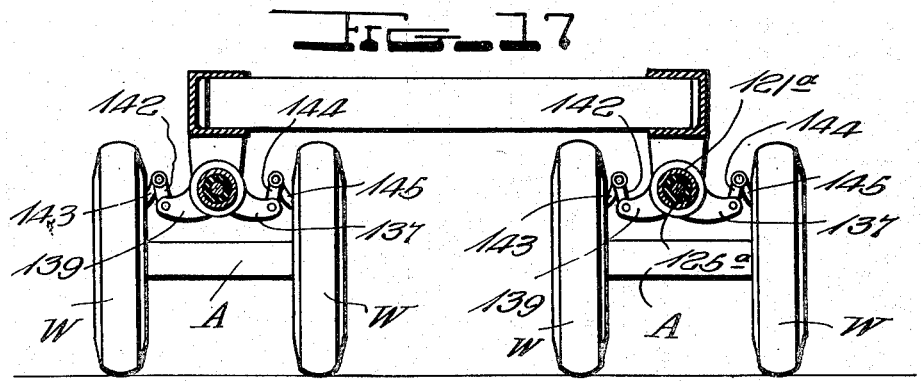
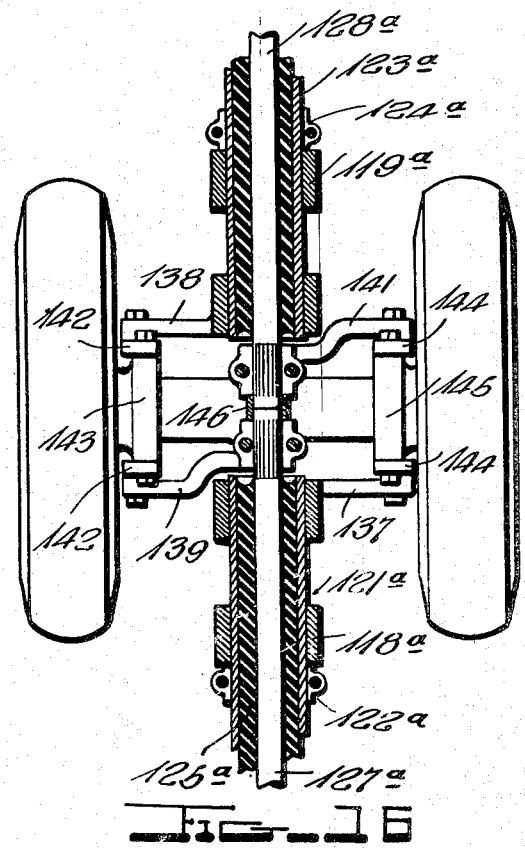
Inventor
Lawrence R. Buckendale,
By Strauch & Hoffman
ATTORNEYS

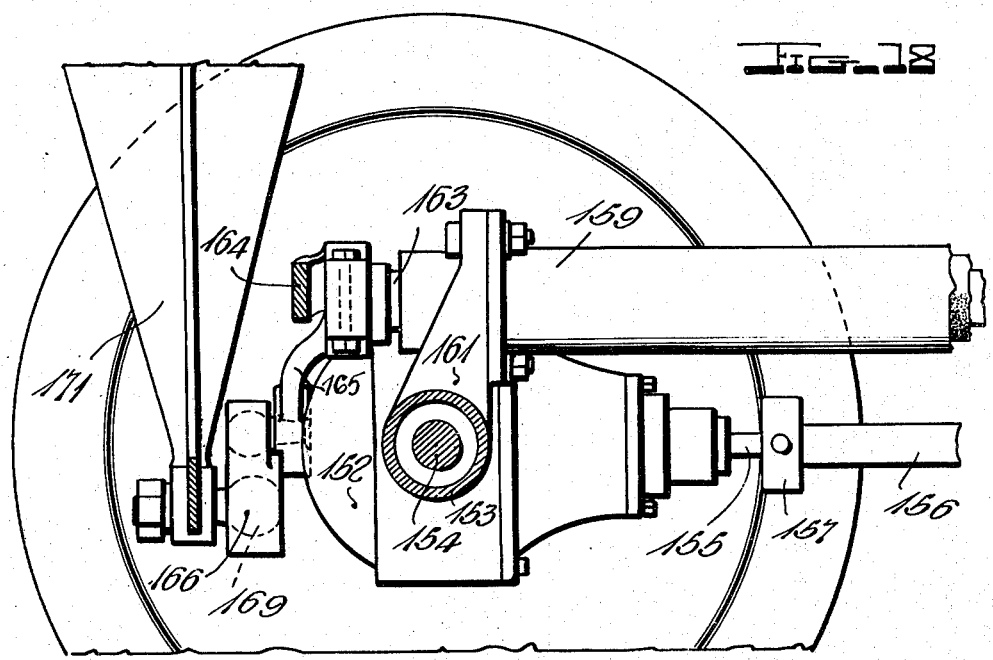
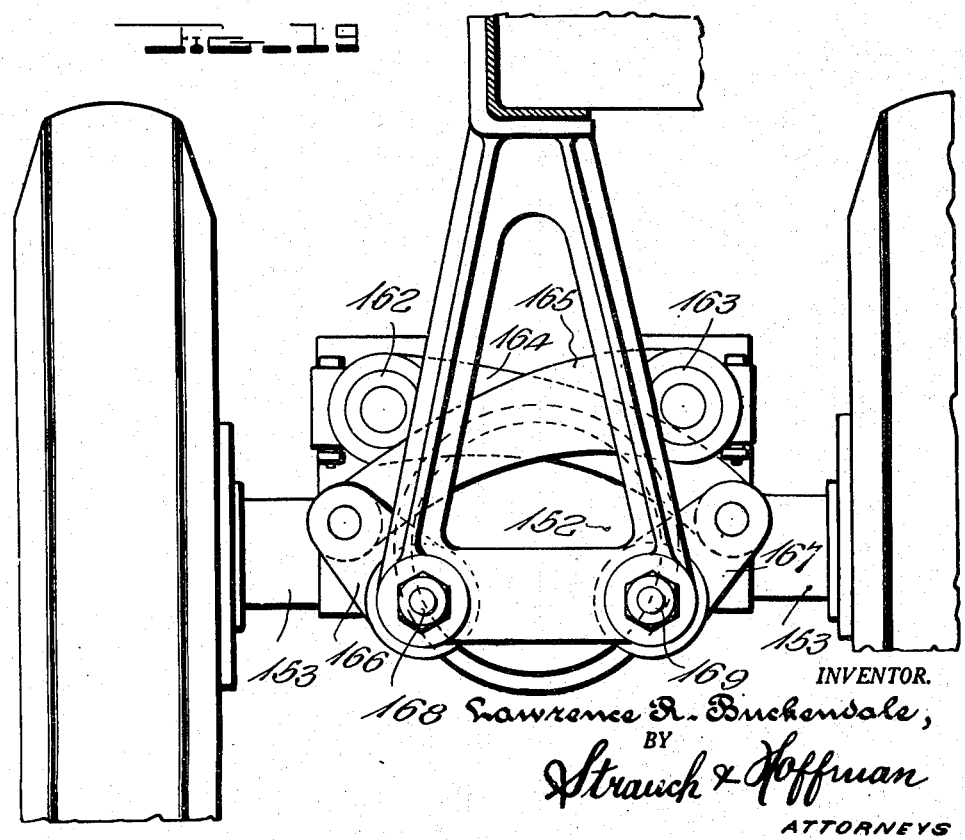

Nov. 9, 1948.  L. R. BUCKENDALE  2,453,116
VEHICLE SUSPENSION
Filed Oct. 28, 1943  13 Sheets-Sheet 12
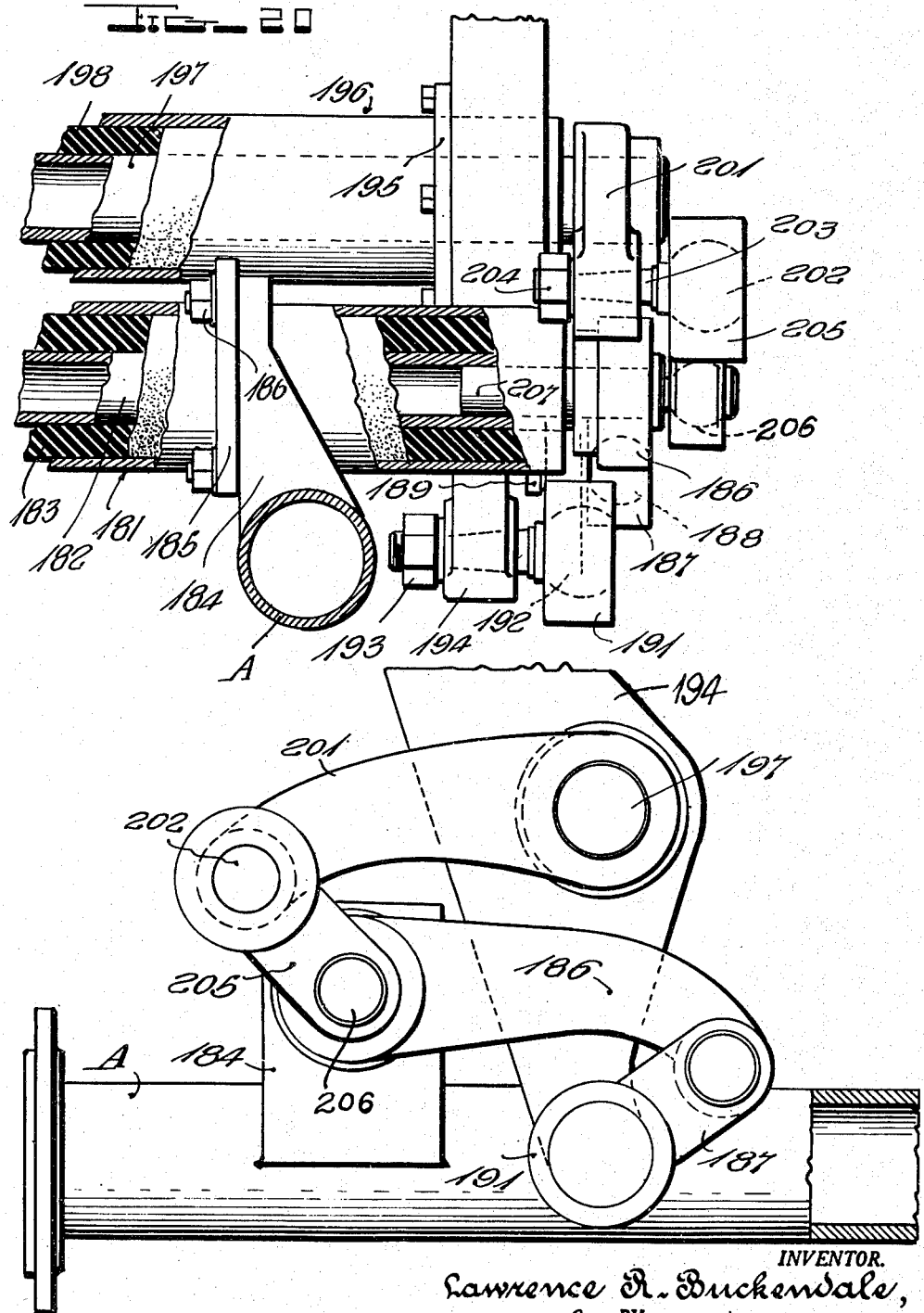
INVENTOR.
Lawrence R. Buckendale,
BY
Strauch & Hoffman
ATTORNEYS

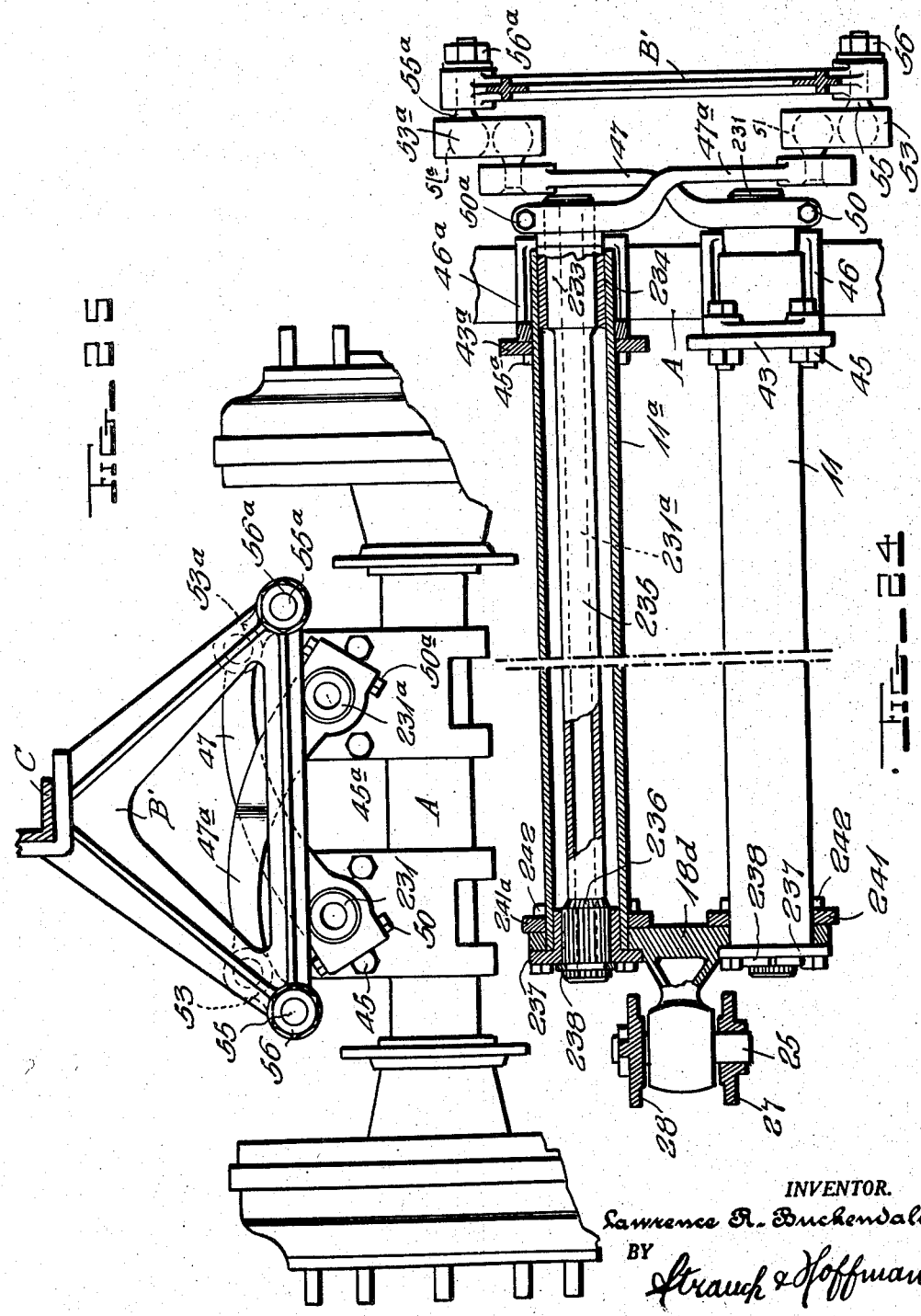

Patented Nov. 9, 1948

2,453,116

UNITED STATES PATENT OFFICE 2,453,116

VEHICLE SUSPENSION

Lawrence R. Buckendale, Detroit, Mich., assignor to The Timken-Detroit Axle Company, Detroit, Mich., a corporation of Ohio Application October 28, 1943, Serial No. 508,020

6 Claims. (Cl. 267—21)

The present invention relates to vehicle suspensions, more particularly suspensions for vehicles of the character in which two stub axle assemblies are disposed side-by-side or abreast of each other adjacent one end of the vehicle, which function as independent units to sustain a part of the total vehicle load, although the invention is not limited to such use, inasmuch as it embodies many features which may be advantageously applied to other types of vehicles.

While stub axle suspensions have been heretofore proposed utilizing one or more leaf springs to connect each axle unit to the chassis, and some of them have gone into limited use, they have not been completely successful, inasmuch as they are of complicated, costly design; they require the use of torque and radius rods to stabilize them, and they furthermore involve large unsprung masses.

I have found that by employing torsion tube assemblies, in which either a telescoped sleeve and shaft are secured together by means of a resilient torsion resisting material, or an elongated rod or tube is anchored to work in torsion, and combining them with the stub axle assemblies in novel relationships, the use of torque or radius rods is largely avoided, because in many instances one or more of the torsion tube assemblies additionally function as torque and/or radius rods and superiorly performing suspensions are provided, which possess a minimum of unsprung masses; efficiently absorb driving or braking torque reactions and maintain the stub axles accurately in the proper longitudinal position with respect to the chassis; provide a limited degree of transverse movement of the two axles with respect to each other and the chassis, affording a self-steering action of adequate magnitude to minimize tire wear and yet have adequate lateral stability under all conditions of operation; impart a minimum of angularity to the torsion tube assemblies for a given vertical deflection of the chassis in response to static or impact loads; limit downward movement of each end of the axle assemblies sufficiently to prevent either tire from running flat when deflated; and yet which are of simple, low cost long-life construction.

In my co-pending application, Serial No. 516,964, filed January 4, 1944, for "Vehicle suspensions," I have disclosed vehicle suspensions utilizing a single torsion tube assembly for resiliently connecting each stub axle to the vehicle chassis, while the present disclosure relates to multiple torsion tube assemblies, in which two or more torsion tube assemblies are employed to connect each stub axle to the chassis.

It is the major object of this invention to provide novel stub axle suspension assemblies in which a plurality of torsion tube assemblies are employed to suspend the chassis on each stub axle, and which provide adequate stability to prevent rotational or longitudinal translational movement of the axles with respect to the chassis; adequate lateral stability while providing sufficient transverse movement of the stub axles to afford adequate self-steering, and yet which are of simple, low cost, rugged construction.

A further important object is to provide vehicle suspensions embodying a plurality of torsion tube assemblies carried by either the chassis or axle and disposed in compact relationship and embodying a plurality of links and levers for simultaneously transmitting resilient, load-sustaining forces between the chassis and axle, and are so designed that they absorb the braking or driving torque reaction of the axle and maintain it in stable cooperative relationship to the chassis at all times.

A further object is to provide a vehicle suspension embodying a plurality of torsion tube assemblies connected to either the chassis or the axle, and having lever and link assemblies for causing one component of each torsion unit to tend to rotate in one direction and the other component to tend to rotate in the opposite direction in response to downward deflection of the vehicle chassis.

Another object is to provide a dual stub axle vehicle suspension with means for resiliently supporting the chassis on the axle and which is operable to limit downward movement of each end of the axle, to prevent running flat in the event of tire deflation.

A further object is to provide novel adjusting devices for relatively angularly rotating the inner and outer units of a torsion tube assembly, which are of simple, low cost construction and yet provide sufficient torque to adjust the parts under the full load of the vehicle.

A further object is to provide a novel stub axle suspension assembly which will resiliently support the chassis on the axles, will absorb torque reactive and longitudinal translational forces and will also provide adequate lateral stability and yet will permit adequate transverse movement of the axles with respect to each other and the chassis to provide a desirable degree of lateral cushioning and affording sufficient self-steering to minimize tire wear.

A further object is to provide a vehicle suspension embodying torsion tube assemblies resiliently interconnecting the axle and chassis and a force transmitting connection operable to effect a minimum angular deflection of the torsion resisting material for a given deflection of the chassis.

Another object is to provide novel drive axle suspensions for either stub or full length axle assemblies in which torsion tube assemblies function to both resiliently interconnect the chassis and axle and to yieldingly absorb the drive and brake torque reaction, and additionally provide a desirable degree of fore-and-aft resilience of the axle with respect to the chassis.

A further object is to provide novel vehicle suspensions embodying a plurality of torsion tube assemblies for resiliently connecting each axle to the chassis, and in which at least one torsion tube assembly is carried by the chassis and at least one torsion tube assembly is carried by the axle, the parts cooperating to provide a limited degree of yieldingly resisted lateral float of the axle and to also absorb driving or braking torque reactions.

Further objects will become apparent as the specification proceeds in conjunction with the annexed drawings, and from the appended claims.

In the drawings:

Figure 1 is a top plan view, with the vehicle chassis omitted and parts broken away to more clearly illustrate the structure, of a vehicle suspension assembly of the invention;

Figure 2 is a side elevational view of the structure shown in Figure 1;

Figure 3 is an end elevational view of the structure shown in Figure 2, as it appears when viewed from the right-hand side of that figure;

Figure 4 is a vertical sectional view taken substantially on the line 4—4 of Figure 2, looking in the direction of the arrows;

Figure 5 is a view similar to Figure 4, but shows a modified form of torsion sleeve adjusting mechanism of the invention;

Figure 6 is a view similar to Figure 4, but shows a further modified form of torsion tube adjusting device of the invention;

Figure 6A is a fragmental top plan view of a modified front end construction of the device shown in Figure 1, also forming part of the invention.

Figure 7 is a view similar to Figure 1, but illustrates a further modified form of vehicle suspension of the invention;

Figure 8 is an end elevational view of the structure shown in Figure 7;

Figure 9 is a fragmental vertical sectional view of the axle mounted end of one of the torsion units;

Figure 10 is a vertical sectional view through a modified form of vehicle suspension of the invention;

Figure 11 is a sectional view through the suspension shown in Figure 10, taken substantially on the line 11—11 of that figure;

Figure 12 is an end elevational view of the structure shown in Figures 10 and 11;

Figure 13 is a vertical sectional view of a further modified form of vehicle suspension of the invention;

Figure 14 is a top plan view of the structure shown in Figure 13;

Figure 15 is a vertical sectional view of a further modified vehicle suspension of the invention;

Figure 16 is a top plan view, with parts in section, of the suspension shown in Figure 15;

Figure 17 is an end elevational view of the suspension shown in Figures 15 and 16, showing the manner in which the two units are connected to the chassis;

Figure 18 is a side elevational view of a drive axle embodying the vehicle suspension of the invention;

Figure 19 is an elevational view of the construction shown in Figure 18, as it appears when viewed from the left-hand side of that figure;

Figure 20 is a side elevational view of a further modified form of suspension of the invention in which one torsion tube assembly is carried by the frame and the other is carried by the axle;

Figure 21 is an end elevational view of the structure shown in Figure 20;

Figure 22 is a diagrammatic view showing the relationship of the links and levers of certain of the illustrated forms of the invention;

Figure 23 is a view similar to Figure 22, but shows the geometry of certain other forms of the invention;

Figure 24 is a view similar to Figure 1, but shows a modified suspension of the invention in which the torsion units are made up of steel rods; and Figure 25 is an end elevational view of the suspension of Figure 24.

With continued reference to the drawings, wherein like reference characters have been employed to designate similar parts throughout the several views thereof, the form of invention illustrated in Figures 1–4, inclusive, comprises a pair of units which are exact duplicates of the one illustrated, one disposed on each side of the vehicle chassis C. Each unit comprises a plurality of torsion tube assemblies or devices T swivelled at their forward ends on the underside of the chassis and rigidly connected at their rear ends to an axle structure A, carrying at least one wheel W at each end thereof, the load of the vehicle being transmitted from the chassis to the torsion tube assemblies by means of a bracket B secured to the side of the chassis and projecting downwardly adjacent the axle.

The torsion tubes are each made up of an outer sleeve 11 and an inner sleeve 12, the two sleeves being concentrically disposed and resiliently connected together by means of a body of rubber or other suitable resilient material 13, securely bonded or otherwise secured thereto and operating in shear to resiliently oppose or resist relative angular movement of the sleeves. Sleeve 12 may be made as a solid shaft if desired. Since the two torsion tube assemblies are identical in construction, the parts of the second assembly have been given similar reference characters with the subscripts "a" and only one assembly will be described in detail. Secured to the forward end of sleeve 11, as by welding or the like, is a flange 14 having an apertured ear 15 for a purpose that will presently appear. The flange is also provided with circumferentially extending slots 16. Sleeve 11 projects through an opening 17 in a casting or bracket 18 and it is adapted to be adjustably clamped thereto by means of cap screws 19 extending through the slots 16.

Frictionally fitted into a horizontally directed transverse opening 21 in the forward end of the bracket is a bushing 22 containing a self-lubricating spherical bearing 23. Journalled in bearing 23 is a ball 24 formed on a sleeve carried by a pin 25 having serrations 26 for restraining the ball against rotation. The pin is pressed into the spaced forks 27 and 28 of bracket 29, the latter being provided with reinforcing webs 31 and is secured to chassis side frame C or any other suitable part of the vehicle in well known manner. Bracket 29 and bearing 30 restrain the torsion suspension devices against rocking about the axis of the axle in response to braking or driving torque reaction, and also precludes translational fore-and-aft movement of the axle with respect to the chassis, and yet freely permits normal deflection of the axle during operation and also, in combination with the linkage to be later described, affords a limited transverse cushioned movement of the axle during operation to provide a desirable degree of self-steering to avoid tire wear.

Although the torsion tubes may be initially adjusted to give the proper tension to suspend the vehicle body at the required level, I preferably provide the novel tensioning or loading mechanism that will now be described and which makes it possible to accurately adjust the torsion tubes angularly into any desired position after the parts have been assembled.

Referring particularly to Figures 1 and 4, pivotally connected to ear 15 of flange 14, by means of a pin 33, is a forked rod 34 which loosely projects through an opening 35 provided in a boss 36 provided on bracket 18. Threaded on the shank 37 of member 34 is a spherical faced nut 38 seating in a spherical seat 39 in boss 36, and it is adapted to be locked in place by a lock nut 41. It is accordingly apparent by loosening screws 19 and lock nut 41, and threading nut 38 down on shank 37, flange 14 and tube 11 may be rocked counterclockwise into any desired angular position against the action of the rubber bushing and the load of the vehicle to raise the vehicle to the proper level. When the parts have been adjusted into proper position, lock nut 41 is tightened and cap screws 19 are also turned home to clamp flange 14 rigidly to bracket 18 to thereby rigidly lock the parts in place. Tube 11a is adjusted in exactly similar manner but is rocked in the opposite direction, by screwing nut 38a onto shank 37a.

The rear end of tube 11 is provided with a flange 43, which is secured to an axle bracket 44 by means of cap screws 45, it being understood that the flange is provided with slots similar to the slots 16 of flange 14, and that when the tube adjustment is being carried out, cap screws 45 will be loosened to permit tube 11 to be rocked into the proper angular position.

Brackets 44 are provided with reinforcing webs 46 and they are secured to axle A by welding or in any other suitable manner. Sleeve 11 projects rearwardly through an opening in the bracket and terminates adjacent the rear of the axle. Inner sleeve 12 projects rearwardly beyond outer sleeve 11 and carries a lever 47 rigidly on the end thereof by a splined connection and is locked in place by a bolt assembly 50 seating in a groove in sleeve 12.

Referring now to Figures 1 and 3, it is observed that lever 47 is of curved form, and is offset so that it may clear the end of sleeve 12a. Lever 47a is reversely curved and is similarly offset so as to clear the end of sleeve 12. The load of the chassis is transmitted to the levers in novel manner, as will now be described.

Rigidly mounted in the free end of lever 47a is a ball-ended pin 51, which is locked therein by welding. The ball of pin 51 is mounted for universal swivelling movement in the free end of a link 53 by means of a bearing (not shown) similar to that employed to swivel bracket 18 on the chassis bracket B. The ball joints employed in the other forms of the invention are preferably of the same type and are similarly illustrated. It will be observed in Figure 3, which illustrates the parts in full load condition, that link 53 inclines upwardly and outwardly with respect to its adjacent wheel W, and the lower end of the link is mounted for universal swivelling movement upon a ball 54 having a tapered shank 55 secured in the lower end of bracket B by means of a nut 56.

It has been found that by employing comparatively long lever arms 47 and 47a, which project beyond the neighboring torsion assembly, and by connecting them to a frame anchor by means of comparatively short links, which incline downwardly and inwardly from said arms approximately at forty-five degrees and are connected to the frame bracket at a level materially lower than the level of tubes 12 and 12a, when the vehicle is loaded and at rest, in combination with a swivel mount on the vehicle for the front end of the torsion assemblies, a superior suspension is provided and one which requires no lateral compensating means between the two suspension units located at opposite sides of the vehicle. For instance, should the vehicle undergo side sway while in operation, one link will swing toward the horizontal and the other toward the vertical, and as they are comparatively short, the load will cause them to manifest increasingly strong "pendulum" tendencies to return to the normal condition shown in Figure 3, thereby adequately stabilizing the construction. Also, the links function as natural side stops, because, when either of them tends to assume a substantially horizontal position, no further relative side movement of the axle with respect to the bracket B can occur. The illustrated arrangement of links and levers also insures minimum distortion of the torsion unit in response to a given frame deflection, irrespective of whether it is of the rubber or metal type.

The inclined link construction shown also makes it possible for the suspension units at opposite sides of the vehicle to undergo a highly desirable degree of self-steering, thereby materially saving tire wear, which usually manifests itself as a lateral scuffing in vehicles in which there is no transverse freedom of movement of the two units. For instance, either one of the units, within the limits permitted by the links, may freely adopt a natural course by pivoting about spherical bearing 23 as a vertical axis. The latter also permits one wheel to rise in following irregularities in the road surface, it being particularly observed that with reference to Figure 3, should the right-hand wheel pass over a bump in the road it will rise, and while the immediate result of this action is to increase the stress in both of the torsion units, the right-hand torsion unit, which is closest to the wheel undergoing lifting, through lever 47a, transmits a lifting force to the left-hand side of bracket B which is somewhat greater than that applied to the right-hand side of bracket B by lever 47. This novel construction serves to distribute the impact in novel manner which makes for easier riding and less wear and tear on the parts.

In Figures 5 and 6 there are shown modified adjusting means for the torsion tubes. In Figure 5 a turn-buckle made up of a part 61 is pivotally connected to ear 15 of flange 14 by means of a pin 62 and a threaded member 63 is locked to a pivoted member 64 by means of a lock nut 65. Members 64 and 64a are pivoted to a post 60, provided on bracket 18, by means of a pin 66. By loosening lock nut 65 and rotating threaded member 63 the link may be shortened, so as to rock flange 14 counterclockwise to properly adjust the height of the chassis with respect to the axle, and member 63a may be manipulated to rock sleeve 11a in the opposite direction.

In Figure 6 there is shown a compression type adjusting unit made up of an internally threaded member 67, pivoted on a pin 68 carried by ear 16 of flange 14. Threaded in member 67 is a bolt or screw 70 having a spherical head seating in a spherical recess 69 in a post 72 provided on bracket 18, and adapted to be locked in place by a lock nut 71. By rotating screw 70, so as to in effect lengthen the link, flange 14 may be rocked counterclockwise to adjust the vehicle suspension in the manner previously described. Member 70a may be similarly manipulated to adjust sleeve 11a.

In Figure 6A I have shown a suspension which differs from the one shown in Figure 1 by embodying a connection between the axle and frame which provides a desirable degree of longitudinal resiliency, and in which the inner rather than the outer tube is secured to the frame. In this form of the invention the inner tubes are split into two parts 12 and 12', so that they can undergo relative axial as well as relative rocking movement. The forward ends of tubes 12' are connected to bracket 18a by means of a spline and a bolt 71' seating in a groove in the tube splines.

This suspension functions substantially the same as the one previously described, sleeves 13 and 13a working in shear and torsionally resisting rocking of levers 47 and 47a and resiliently supporting the chassis. In addition, tubes 12' and 12'a, through the short resilient bushing sections, resiliently support the forward ends of tubes 11 and 11a on the chassis, and function to absorb longitudinal shocks developed incident to normal vehicle operation.

Referring now to Figures 7, 8 and 9, there is illustrated a suspension which differs primarily from the one shown in Figures 1 to 4, inclusive, by reversing the parts connected to the respective levers and anchors.

In this form of the invention, (describing in detail only one of the two illustrated assemblies) inner sleeve 12b projects into openings in a modified form of bracket 18b and is secured therein by bolt 73. Bracket 18b is swivelled on pin 25 carried by bracket 27 in the manner previously described. Axle A is provided with a pair of double arm saddles 74b and 74c. Sleeve 11b is journalled in the forward arm 75b of saddle 74b and is restrained against endwise displacement therein by lock nuts 76b and the hub of a lever 77b rigidly secured to the rear end of the sleeve. Rod 12b projects rearwardly beyond the axle and is journalled in a bushing carried in the rear leg 78b of the saddle. As seen more clearly in Figure 8, levers 77c and 77b are of curved form and overlie the neighboring torsion tube assembly. Pivotally connected to the free end of lever 77b is a link 79b, which is secured to one side of a modified form of bracket 81b secured to the underside of the chassis frame or other suitable part of the vehicle. Lever 77c is connected by a similar link assembly 79c to bracket 81b.

From the foregoing it is apparent that the axle is restrained against rocking or translational movements with respect to the chassis by virtue of tubes 11b and 11c being journalled in the axle saddles, and that as the sleeves are free to turn in the saddles under the yielding action of the rubber working in shear, the vehicle is supported in much the same manner, and the suspension has the same advantages as the forms of the invention previously described.

It should be observed that in this form of the invention the axes of tubes 11 and 11a are located below the level of the pivotal connection of links 79b and 79c to bracket 81b and that the links incline upwardly and inwardly. This insures in the deflection of the frame producing minimum angular deflection of the torsion assemblies, in a manner similar to that effected by the link assembly of Figures 1 to 4, inclusive.

Referring to the form of the invention illustrated in Figures 10, 11 and 12, the double torsion rod units rather than being disposed side-by-side are disposed in end-to-end relationship. Axle A is provided with a saddle having opposed journal portions 82 and 83, in which sleeves 84 and 85 are freely journalled. Endwise movement of sleeve 85 is limited by means of lock nuts 86. The forward end of sleeve 85 is formed with a ball portion 87 which is journalled in a spherical bearing 88 carried by a bracket 89 secured to the chassis. Concentrically disposed in sleeves 84 and 85 are shafts or tubes 91 and 92, respectively, which are resiliently connected to the sleeves by means of resilient bushings 93 and 94, respectively, it being understood that the resilient material is intimately bonded to both the sleeve and shaft. The neighboring ends of shafts 91 and 92 are serrated or splined, and rigidly secured thereto are levers 95 and 96, which project in opposite directions from the assembly as seen in Figure 11. The levers are secured to the shafts in any suitable manner, as for instance by split hubs clamped in place by cap screws 97, although it is to be understood that any other suitable form of securing means may be employed. Levers 95 and 96 carry tapered ball swivel members 98 at their ends, the latter having tapered shanks 99 secured in the levers.

Splined to sleeves 84 and 85 are levers 102 and 103, respectively, which are restrained against endwise movement by means of a pair of split rings 104 in grooves in the ends of the sleeves, and endwise movement of sleeve 84 is limited by a pair of lock nuts 105 threaded onto the sleeve. Levers 102 and 103 each carry ball swivel members 107 at their free ends having tapered shanks 109 secured in the respective levers.

Referring to Figures 11 and 12, the vehicle load is transmitted to the levers by means of a bracket 111 having four arms projecting down into proximity to the ends of the levers. Pivotally connected to the lower end of each leg of bracket 111, by means of a ball ended pin 112 secured in place by a nut 113, is one end of a link 115, the latter being swivelled at their other ends on members 98 and 107.

From the foregoing structure it is apparent that sleeve or tube 85 functions as a radius and torque rod, to restrain the axle against rotation in response to torque reaction and to also restrain it against longitudinal displacement with respect to the chassis. Since the links 115 incline upwardly and inwardly as seen in Figure 12, and the pivotal points of securement of the links to the levers are located slightly above the level of the sleeves, the suspension possesses the same self-steering and cradling actions as the forms of the invention first described, and at the same time the resilient material is subjected to minimum angular distortion. Inasmuch as the rod and sleeve of each torsion device are connected to levers which extend in opposite directions from the device and are connected to the frame, each torsion device is accordingly independent of the other. They may therefore be of different lengths and/or of different capacities as each unit will perform its load sustaining function independently of the other. It is also to be understood that as the axle assembly undergoes deflection in response to road irregularities the four lever arms will be deflected downwardly against the action of the rubber sleeves and that sleeves 84 and 85, in response to downward movement of levers 102 and 103, will freely rock in saddles 82 and 83, it being understood that a bushing or other bearing may be incorporated therein to reduce friction if desired.

In Figures 13 and 14 there is shown a further modification of the invention wherein the torsion tube assemblies are both carried by the frame, and the torque and drive loads are taken by a separate torque rod 116 pivotally connected to a bracket 117 mounted on the chassis forwardly of the axle.

In this form of the invention the torsion rod assemblies are journalled in a pair of brackets 118 and 119 secured to the chassis. A sleeve 121 is journalled in bracket 118 and is restrained against endwise movement by means of a split collar 122. Sleeve 123 is journalled in bracket 119 and is provided with a split collar 124.

Secured to sleeves 121 and 123, by means of resilient sleeves 125 and 126, are rods 127 and 128 respectively.

Splined to sleeves 121 and 123 are levers 129 and 131 which project transversely in one direction from the sleeves. A pair of levers 132 and 133 are splined on the ends of rods 127 and 128 and project in the opposite direction from levers 129 and 131, as seen in Figure 14. The free ends of levers 129, 131, 132 and 133 are connected to posts or brackets 134 on the axle by means of a plurality of links 135, which preferably incline upwardly and outwardly adjacent each wheel in the manner of the assembly shown in Figures 1 to 4, inclusive, inasmuch as in this instance the point of pivotal securement of the links to the levers is below the level of the tube axes.

This form of invention accordingly provides a double torsion rod assembly suspension in which the torquing and translational reactions applied to the axle are transmitted directly to the frame through torque rod 116, while the load is sustained by two torsion rod assemblies through lever and link assemblies, it being understood that the structure functions substantially in the same manner as those previously described.

In Figures 15, 16 and 17 there is disclosed a further form of the invention which differs from the one just described chiefly by omitting torque rods and relying upon the levers and links to take the torque reactions.

Since many of the parts of this device are the same as those shown in Figures 13 and 14. similar reference characters. with a subscript "a," will be employed to designate like parts. As seen in Figure 16, sleeves 121a and 123a are provided with levers 137 and 138 which project in opposite directions from the torsion assembly. Rods 127a and 128a are provided with a pair of levers 139 and 141, which extend in opposite directions. As seen in Figure 16, levers 138 and 139 are pivotally connected to the lower ends of links 142 pivotally connected at their upper ends to perches 143 secured to axle A, it being understood that if desired links 142 may be pivoted to brackets carried by the usual brake foundation plate.

Levers 137 and 141 are pivotally connected to the lower ends of links 144 pivotally connected at their upper ends to perches 145 on the axle housing. As seen in Figure 17, links 142 incline upwardly and outwardly in this form of the invention to reduce torsion tube angularity in response to chassis deflections. In addition to providing a cradled suspension, the uni-planar pivots for the links provide a connection having adequate capacity to sustain the load of the vehicle and also restrain the axle against rocking movement in response to torquing or translational movement with respect to the chassis, thereby making it unnecessary to provide torque or radius rod assemblies.

In this form of the invention the torsion rod assembly is further stabilized by means of a bushing 146 slidably mounted on the neighboring ends of rods 127a and 128a between levers 139 and 141 which confines the rods to rocking movement about a common axis.

While the vehicle suspensions so far described have been illustrated as applied to non-driving or trailer axles, it is to be understood that the invention is not limited thereto and may readily be applied to driving axles, and in Figures 18 and 19 there is disclosed the suspension of Figures 1-4, inclusive, applied to such an axle.

In this form of the invention there is shown a drive axle housing a central bowl portion 152 and oppositely extending axle arms 153. An axle shaft 154 is mounted in each axle arm and drivingly connected to the respective wheels W. A differential in the housing bowl is drivingly connected to the axle shafts in well-known manner and carries a ring gear meshing with a pinion, (not shown) the latter being driven by a pinion shaft 155 and a propeller shaft 156, a universal joint 157 being interposed between the shafts and the parts cooperating to form a "Hotchkiss" drive.

Disposed on opposite sides of the axle bowl, and pivotally connected to the chassis frame in the same manner as the device shown in Figure 1, is a pair of torsion tube assemblies one of which is indicated at 159, secured to saddles 161 mounted on the axle arms.

Secured to rods 162 and 163 of the torsion assemblies are levers 164 and 165 respectively, which are pivotally connected at their free ends to links 166 and 167. The lower ends of links 166 and 167 are swivelled on ball mountings 168 and 169 carried by the lower end of a frame bracket 171, in a manner similar to the device shown in Figure 1.

From the foregoing disclosure it is apparent that this form of the invention provides a drive axle upon which the vehicle is suspended in a manner similar to the one of Figures 1-4, inclusive, and in which both the brake and drive torquing reactions are taken by torsion tube assemblies 158 and 159, and the latter also restrain the axle against translational movements longitudinally of the chassis. The parts accordingly cooperate to form a "Hotchkiss" drive and one which, by reason of the upward and outward inclination of links 166 and 167, provides a cradled vehicle suspension, affording a desirable degree of self-steering and yet provides adequate lateral stability during operation.

While I have shown both idle and drive axles of the non-steering type, it is to be understood that if desired the invention may be readily applicable to steering drive axles, inasmuch as it is only necessary to mount the spindles for steering movements upon the ends of the axle structure to provide perfectly satisfactorily performing steering axles of either the driving or non-driving type. It is also to be understood that the several forms of the invention disclosed may be incorporated in full length axles as well as the stub axles illustrated, and be applied either as a front or rear wheel suspension of either the driving or non-driving type. Also, the various suspensions may be applied to so-called "six-wheelers," embodying two rear axles, and any desired form of compensatory device may be incorporated between the two rear axles to stabilize them if found necessary or desirable. However, it has been found that the novel relationship of the levers and links herein disclosed will ordinarily provide sufficient lateral stability, and that compensatory linkages and additional stabilizing means is unnecessary.

In all of the foregoing forms of suspensions of the invention the torsion tube assemblies perform the additional important function of limiting downward movement of each end of the axle assemblies to prevent either tire from running flat when deflated.

In certain suspensions it is desirable to support one torsion device upon the frame and the other upon the axle, and in Figures 20 and 21 there is disclosed an assembly suspension of this character.

In this form of the invention a torsion tube device having an outer sleeve 181 and an inner sleeve 182, resiliently interconnected by a rubber sleeve 183, are adjustably mounted upon a saddle 184 carried upon the axle housing A in a manner similar to the one disclosed in Figures 1-3, the outer sleeve having a flange 185 adjustably secured to the mounting flange on the saddle by means of nut and bolt assemblies 186. The forward end of tube 181 (not shown) is pivotally secured to frame bracket 29 in a manner similar to tubes 11 and 11a of Figures 1 and 2, and accordingly functions as a torque rod, to take driving and braking torque reactions.

In this form of the invention inner sleeve 182 extends rearwardly beyond axle A and rigidly carries a lever 186, which is connected to a link 187 by means of a ball and socket joint, the ball 188 having a tapered shank secured in the link by a nut 189. The link extends upwardly and outwardly (Figure 21), as in the form of invention shown in Figures 1-3, inclusive, and has a large head 191 at its lower end which is swivelled on a ball 192 having a tapered shank secured in a special frame bracket 194 by means of a nut 193.

From the structure so far described it is apparent that downward movement of frame bracket 194 in response to deflection of the chassis will, through link 187, result in rocking lever 186 clockwise against the action of the rubber bushing, in a manner similar to the device of Figures 1-3. In this form of the invention the second torsion device is carried rigidly by the frame and comprises an outer sleeve 196 rigidly anchored in an enlargement of frame bracket 194 in any suitable manner, as by means of a bolted flange 195 and embodies an inner sleeve 197 connected to outer sleeve 196 by a resilient sleeve 198. Rigidly secured to the end of sleeve 197 is a lever 201 carrying a ball 202 at its free end, the ball having a tapered shank 203 secured in the end of the lever by a nut 204. Swivelled on the end of ball 202 is a link 205, whose lower end is swivelled on a ball 206 formed on the end of a short shaft section 207 fitting in the end of sleeve 182 of the lower torsion tube assembly. The forward ends of outer tubes 181, 196 may be mounted on the axle and frame respectively in any suitable manner, preferably in accordance with the teachings of Figures 1 to 6, inclusive, so as to provide for adjustment of the outer tubes. To this end the bolt holes in flanges 185 and 195 are slotted, so that the bolts may be loosened and the flanges and tubes rotated into the proper adjusted positions.

From the foregoing it is apparent that downward deflection of the vehicle chassis is resisted by both torsion tube assemblies and their associated levers and links. Lever 201 through link 205 transmits a portion of the chassis load directly to short shaft section 207, which in turn transmits it through tube 181 to axle bracket 184. It is to be noted however that since link 205 is freely pivoted or journalled upon ball 206, any counter rotative tendencies of link 205 and lever 186, which is connected to tube 182, will not be transmitted to each other, and each torsion tube device is accordingly free to operate independently of the other in response to chassis deflections.

Referring to all of the suspensions herein disclosed, it has been found that the length of the links connecting the levers to the chassis or the axle largely determines the character of the stabilizing action and that in general the shorter the links are the greater will be the lateral stabilizing action set up, inasmuch as the short links cause the suspension to strongly seek a stable position. In order to insure the proper stabilizing action at all times the links for connecting the lever arms of the various torsion suspensions to their respective supporting or supported elements are preferably so disposed as to function as depending or tension members. There is accordingly no possibility, in the suspensions illustrated, of the links swinging past dead center with respect to their levers. However, it is to be understood that all phases of the invention are not limited to the employment of tension links, inasmuch as certain features of the invention are capable of advantageous use in other types of suspensions, in which compression links are utilized to transmit the vehicle load to the axles.

In Figures 22 and 23 I have diagrammatically illustrated the geometry of the various preferred forms of linkages employed for securing the torsion tube assemblies to the vehicle chassis and axle. In Figure 22 the relationship of the parts of the forms of invention shown in Figures 1, 2, 3, 18 and 19 is shown, and in which the axis of the torsion tube is designated 211, the lever secured to either the inner or outer tube designated 212, and the link pivotally connecting the free end of the lever to the chassis is designated 213. The lower end of link 213 is connected to the chassis at 214. Also shown in Figure 22 is a dotted line illustration of the positions assumed by lever 212 and link 213 when the lower end of the link or anchor point 214 is deflected downwardly, in response to loading the vehicle, through a distance designated 215. Since the suspensions all embody opposing lever and link assemblies it is assumed for purposes of illustration that the chassis moves vertically. The angular displacement of the lever to the position 212a in response to the chassis deflection 215 is designated 216. The shearing action set up in the resilient bushing in response to the given deflection 215 is directly proportional to angle 216, and from the foregoing it is apparent that the latter is the minimum for a given frame deflection. In other words, chassis deflections, as a result of either static or impact loads, are reflected as a materially smaller angular swing of the torsion member.

While the foregoing preferred lever and link arrangements place the torsion tube assembly at a mechanical disadvantage, i. e., the resilient sleeve is placed under a greater unit stress than if lever 212 were horizontal, it is apparent that it is only necessary to incorporate in the torsion tube device sufficient capacity to sustain the load, inasmuch as the novel linkage assures limitation of angular swing of the levers well within the limitations of shear of the rubber or other resilient material incorporated in the resilient sleeve.

In Figure 22 I have also illustrated in phantom lines the conditions which would obtain if the link were given an opposite inclination to that employed in the preferred constructions. In this instance the link 217 is illustrated as depending from the free end of lever 212, but is given an opposite inclination and has a lower end pivoted on the chassis at 218. It is assumed in both instances that the load is carried by the lower ends of the links, and it is apparent that when the lower end of link 218 is displaced through a vertical deflection 215, lever 212 and link 217 will be disposed as shown in the positions designated 212' and 217'. This results in lever 212 being displaced through an angle 219, the latter being approximately twice angle 216, and therefore placing the rubber or other resilient sleeves under approximately twice the shearing stress as the preferred assemblies.

In Figure 23 I have illustrated the relationship between the parts when the free end of the lever is disposed above rather than below the plane of a torsion tube assembly, as for instance in the suspensions shown in Figures 8, 9, 10 and 12.

As previously pointed out, when the free end of the lever is disposed above the axis of the torsion tube device, it is necessary to give the link an inward and upward inclination with respect to the torsion tube. The lever and the link are designated 212 and 213, respectively, as in Figure 22, but in this instance link 213 inclines inwardly and upwardly. As seen in Figure 23, when lower end 214 of the link is displaced through a deflection 215, the lever is rocked into the position 212a through a comparatively small angle 221.

In Figure 23 I have also illustrated the relationship between the parts when a link 222, inclining upwardly and outwardly, and having a lower pivoted end 223, is connected to lever 212 and is deflected through a distance 215. In this instance lever 212 is rocked into the phantom line position 212' through a comparatively large angle 224, showing that shearing stress in the bushing will be materially greater when the link is given an upward and outward inclination.

It is to be understood that, while I have disclosed the torsion rod or tube assemblies of the foregoing forms of the invention as embodying outer and inner telescoped members connected together by a sleeve of resilient material, the advantages of the invention also are fully realized when the torsion assemblies assume the form of steel or other metallic torsionally yieldable tubes or rods carrying levers or cranks at one end and which are journalled in the tubes or other supporting members adjacent the levers and are anchored against angular movement at the other end, and in Figures 24 and 25 the suspension of Figures 1-4, inclusive, is illustrated as embodying that type of torsion unit. In this form of the invention I have also illustrated the torsion levers as projecting upwardly rather than downwardly with respect to the torsion tube axes, as an example of a suspension of the invention in which the rear frame bracket is of decreased vertical height.

With continued reference to Figures 24 and 25, outer tubes 11 and 11a are secured to the saddles 46 and 46a on axle A by nut and bolt assemblies 45, in the manner previously described. In this instance levers 47 and 47a are carried by the rearwardly projecting ends of resilient torsion rods 231 and 231a, which are illustrated as being of tubular form and replace the rubber sleeves, but which are designed to undergo torsional deflection and resiliently support the load in a manner similar to the rubber torsion rod assemblies previously described. The torsion rods may be of steel or other suitable alloy and may be of either solid or tubular form. The rear ends of the rods are provided with enlarged diameter portions 233 which are freely journalled in bushings 234 secured in the rear ends of tubes 11 and 11a, it being understood that the torsion rods are provided with serrated ends to provide a good connection with the levers. The forward ends of the lever hubs engage the radial end faces of bushings 234, to limit forward movement of the torsion rods.

Each torsion rod is provided with a reduced medial portion 235, which constitutes the torsionally resilient section of the rod and is adapted to undergo angular distortion or torsion in response to operation of the vehicle. The front ends of the rods are of enlarged diameter and are provided with splines 236 which engage internal splines formed in flanged collars 237 secured to the rear face of bracket 18d by bolt assemblies 242. Rearward movement of each torsion tube is limited by a split ring 238 sprung into a groove in the ends of the torsion rods and engaging the front faces of collars 237.

In this form of the invention simple plates 241 and 241a are welded or otherwise secured to the forward ends of tubes 11 and 11a, respectively, and are rigidly anchored to bracket 18d by the same bolt and nut assemblies 242 which anchor collars 237 in place. Bracket 18d is connected with pin 25 carried by portions 27 and 28 of frame bracket 29 in the same manner as is illustrated in Figure 1.

From the foregoing disclosure it is apparent that outer tubes 11 and 11a are rigidly anchored to bracket 18d and axle A and function as radius rod members confining the axle to pivotal movement about a fixed point on the chassis, and that torsion rods 231 and 231a, being fixed in tubes 11 and 11a at their front ends, resiliently resist downward movement of levers 47 and 47a, which through links 53 and 53a, resiliently support the vehicle chassis in a manner similar to the forms of invention previously described.

In this form of the invention I have disclosed a further alternative arrangement of the links and levers which makes it possible for frame bracket B' to be of materially decreased vertical height. As seen in Figure 25, levers 47 and 47a incline upwardly and overlie the axes of their neighboring torsion tube assemblies. With the levers so disposed, links 53 and 53a preferably incline downwardly and outwardly to their points of pivotal attachment to ball members 55 and 55a carried by frame bracket B', which, as shown is of materially shorter vertical height than the bracket B of Figure 1. The frame bracket is considerably wider in order to provide for the downward and outward inclination of links 53 and 53a. This inclination of the links, as previously pointed out, is preferable as it provides minimum angular deflection of the torsion rods in response to a given deflection of the chassis with respect to the axle.

From the foregoing it is apparent that the torsion rod assembly of Figures 24 and 25 provides a suspension affording the same advantages as the resilient sleeves utilized in the forms of invention previously described, and it is to be understood that the metallic torsion rod assembly of Figures 24 and 25 may be incorporated in any of the forms of invention as a replacement for the rubber sleeve assembly. Accordingly, the term "torsion tube" or "torsion rod" assembly, as employed in the appended claims, is intended to embrace those assemblies embodying a resilient sleeve interposed between two relatively rockable members, or the metallic torsion rod assembly shown in Figures 24 and 25, in which the load is carried by a metallic or other torsionally deflectable rod of either solid or tubular form.

From the foregoing disclosure it is apparent that the invention provides novel vehicle suspensions utilizing torsion tube assemblies, which largely eliminate the need for torque or radius rods, which possess a minimum of unsprung masses, efficiently absorb driving or braking torque reactions and maintain the axles accurately in the proper longitudinal position with respect to the chassis; provide a limited degree of transverse movement of the two axles with respect to each other and the chassis; afford a self-steering action of adequate magnitude to minimize tire wear and yet have adequate lateral stability under all conditions of operation; impart a minimum of angular stress to the torsion tube assemblies for a given vertical deflection of the vehicle chassis in response to static or impact loads; limit downward movement of each end of the axle to prevent either tire from running flat when deflated and embody novel means for adjusting the sprung or suspended weight of the chassis relative to the axle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle suspension, a vehicle chassis, an axle assembly adjacent one end of said chassis comprising a transverse axle structure carrying at least one wheel at each end thereof; a pair of torsion suspension devices located in side-by-side relationship and extending substantially longitudinally of said chassis: said suspension devices each comprising a rod member and an enclosing sleeve member resiliently connected together by a sleeve of resilient material; means for connecting one end of one member of each of said suspension devices to said chassis for limited rocking movement about vertical and horizontal axes; means for connecting the opposite end of one member of each of said suspension devices to said axle structure in such manner as to restrain the latter against rocking or longitudinal translational movements with respect thereto; lever means on one member of each of said suspension devices adjacent said axle structure; and link means connecting said levers to said chassis in such manner that said last-named members are rocked in opposite directions relative to each other in response to the load imposed thereupon by said chassis.

2. The vehicle suspension defined in claim 1, wherein the sleeve member of each suspension device is pivotally connected to said chassis and is rigidly connected to said axle structure, so as to function as a torque and radius rod assembly, and the rod member of each suspension device carries said lever means.

3. The vehicle suspension defined in claim 1, together with means for adjusting one member of each of said suspension devices about its axis by small angular increments for varying the suspension action of said resilient material and said lever means.

4. The vehicle suspension defined in claim 1, wherein said link means comprises link elements pivotally connected to the free ends of said lever means and pivotally connected to said chassis, said pivots being so disposed that planes containing the axes thereof intersect below said axle structure at a region approximately midway between said wheels when said chassis is loaded and is at rest.

5. In a vehicle having a chassis, an axle assembly adjacent one end of said chassis comprising a transversely disposed axle structure carrying at least one wheel at each end thereof; a pair of longitudinally extending torsion devices disposed in spaced, substantially parallel relationship; means for securing the forward ends of said devices to said chassis for free swivelling action about a fixed pivot, means connecting said devices to said axle structure, said devices, adjacent said axle, each having a lever arm projecting toward the other device and each device having means for resiliently urging said lever arm upwardly, said lever arms projecting laterally beyond the neighboring torsion device and terminating between said neighboring torsion device and the wheels; and means for connecting the free ends of said levers to the chassis in suspending relationship therewith.

6. In a vehicle having a chassis supported by a wheeled axle, means for resiliently connecting said chassis and said axle comprising an inner member and an outer member telescoped over the inner member and connected thereto by a body of resilient material working in shear to yieldingly resist relative rocking movement of said members, one member being pivoted for rocking movement on said chassis and the other member having a lever rigidly carried thereby and terminating in a free end transversely spaced from the axis of said other member, means for securing said axle to said one member in longitudinally spaced relation to the pivotal connection between said one member and said chassis, a link pivotally connected to the free end of said lever, means for pivotally securing said link to said chassis, the free end of said lever being disposed below the rockable members, and said link extending downwardly from the end of said lever and inclined inwardly toward a vertical plane containing the axis of said members, whereby downward deflection of said chassis results in increasing the angle between a plane containing the pivotal axis of said link and a plane containing the axis of said members and the end of said link connected to the free end of said lever.

LAWRENCE R. BUCKENDALE.

REFERENCES CITED

The following references are of record in the file of this patent:

UNITED STATES PATENTS

| Number | Name | Date |
|---|---|---|
| 1,205,612 | Ford | Nov. 21, 1916 |
| 1,554,102 | Kysor | Sept. 15, 1925 |
| 1,919,022 | Noble | July 18, 1933 |
| 2,046,206 | Ose | June 30, 1936 |
| 2,051,864 | Knox et al. | Aug. 25, 1936 |
| 2,191,211 | Krotz | Feb. 20, 1940 |
| 2,242,030 | Hicks | May 13, 1941 |
| 2,270,571 | Woolson et al. | Jan. 20, 1942 |
| 2,330,482 | Fageol | Sept. 28, 1943 |

FOREIGN PATENTS

| Number | Country | Date |
|---|---|---|
| 378,675 | Italy | Feb. 21, 1940 |
| 844,796 | France | May 1, 1939 |